US008605933B2

(12) United States Patent
Massey

(10) Patent No.: US 8,605,933 B2
(45) Date of Patent: Dec. 10, 2013

(54) MULTI FUNCTION CABLE CLIP DEVICE

(76) Inventor: Alan T. Massey, Austin, TX (US)

( * ) Notice: Subject to any disclaimer, the term of this patent is extended or adjusted under 35 U.S.C. 154(b) by 147 days.

(21) Appl. No.: 13/068,546

(22) Filed: May 13, 2011

(65) Prior Publication Data
US 2012/0288132 A1 Nov. 15, 2012

(51) Int. Cl.
*H04R 25/00* (2006.01)

(52) U.S. Cl.
USPC .............. 381/374; 381/370; 381/381

(58) Field of Classification Search
USPC ............ 381/370–384; 181/129–130; 379/430
See application file for complete search history.

(56) References Cited

U.S. PATENT DOCUMENTS

| 5,625,171 A | 4/1997 | Marshall |
| 2008/0013776 A1* | 1/2008 | Chen ............................ 381/381 |
| 2008/0310666 A1* | 12/2008 | Wengreen ..................... 381/381 |
| 2011/0002499 A1* | 1/2011 | Hoggarth et al. ............. 381/381 |

* cited by examiner

*Primary Examiner* — Duc Nguyen
*Assistant Examiner* — Matthew Eason
(74) *Attorney, Agent, or Firm* — James R Bell

(57) ABSTRACT

A cable includes a first portion and a second portion. An earpiece speaker is attached to the first portion of the cable. An earhook is provided and a multi-purpose clip is simultaneously attached, in a first use mode, only to the earpiece speaker and the earhook. In a second use mode, the clip is simultaneously attached to the earhook, the earpiece speaker and the second portion of the cable. Also in a first use mode, each of a pair of clips is simultaneously connected only to a respective earpiece speaker and a respective earhook. In a second use mode, at least one of the clips is simultaneously connected to a respective earhook, a respective earpiece speaker and the second portion of the cable.

2 Claims, 5 Drawing Sheets

MULTI FUNCTION CABLE CLIP DEVICE

BACKGROUND

The present disclosure relates generally to clips and more particularly to clips for use with cables associated with portable personal electronic devices.

There are an increasing number of various portable electronic devices being carried by persons for listening, recording, communicating, and other functions. Often, such devices can be used with earpieces interconnected with the devices by cables. These cables typically include a plug attached to the device at one terminal end and earpieces connected at another terminal end. The earpieces may be simultaneously mounted in or on both of a user's ears, and in some cases only one of the earpieces is used. Thus the unused earpiece and associated cable can dangle uncomfortably so as to create an obstruction.

Accordingly, it would be beneficial to provide for management of such a dangling earpiece.

SUMMARY

One embodiment, accordingly, includes a cable clip apparatus and system. Thus, a cable includes a first portion and a second portion. An earpiece speaker is attached to the first portion of the cable. An earhook is provided and a multipurpose clip is simultaneously attached, in a first use mode, only to the earpiece speaker, and the earhook. In a second use mode, the clip is simultaneously attached to the earhook, the earpiece speaker and the second portion of the cable.

DETAILED DESCRIPTION

Figure 1:
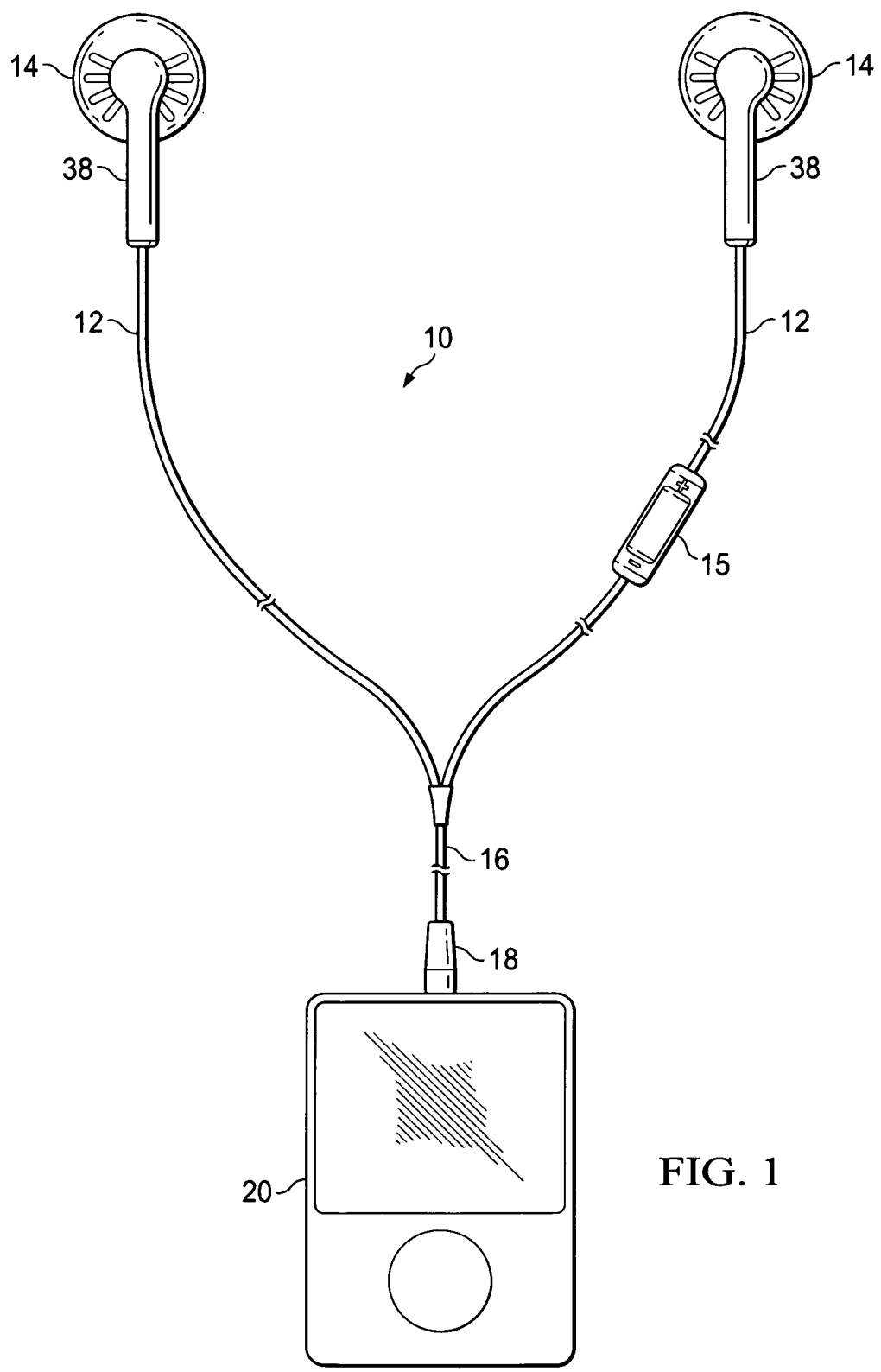
FIG. 1 is a frontal view illustrating an embodiment of a cable interconnecting a device at one end and a pair of earpieces at another end.

A cable 10, FIG. 1, includes a pair first portions 12, each of which are connected to a respective earpiece speaker 14 including a stem 38. One of the first portions 12 of cable 10 may include a volume and selection control member 15. The pair of first cable portions 12 are joined to form a second cable portion 16 which is of a relatively larger diameter than each of the first portions 12. The second cable portion 16 includes a plug 18 detachably connected to an electronic device 20 which may be used for listening, recording, communicating, and other functions. The control member 15 is functional to control volume and selection relating to the electronic device 20.

Figure 2:
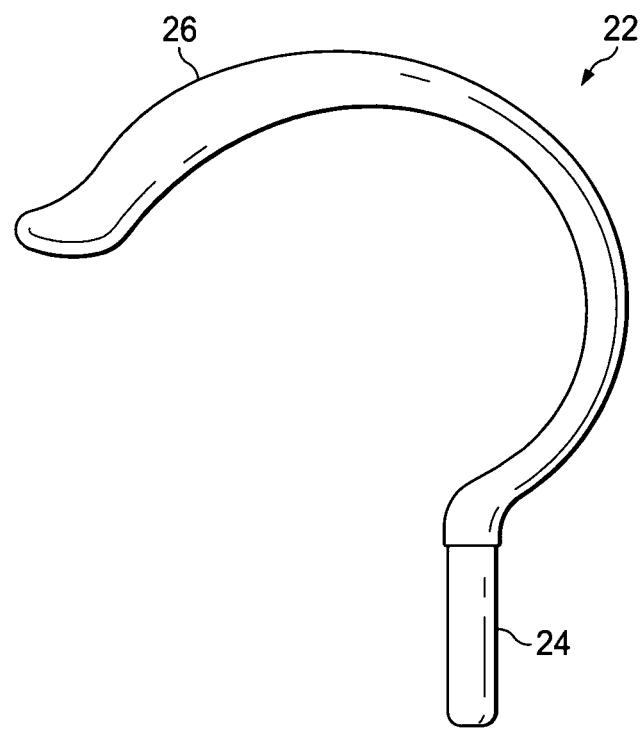
FIG. 2 is a side view illustrating an embodiment of an earhook.

An earhook 22, FIG. 2, includes a post member 24 and a curved hook member 26. The post member 24 is detachably connectable to a member as will be described below. The hook member 26 may be used to be retained on a user's ear.

Figure 3:
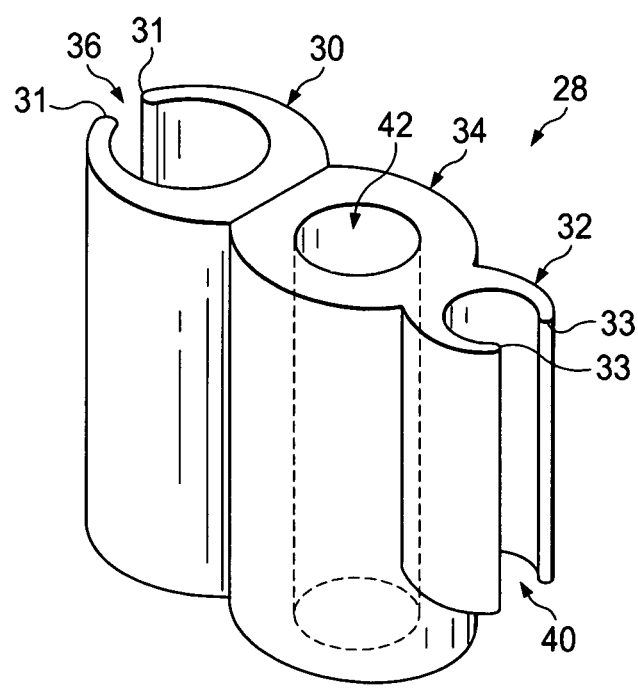
FIG. 3 is a perspective view illustrating an embodiment of a multifunction cable clip.
Figure 4:
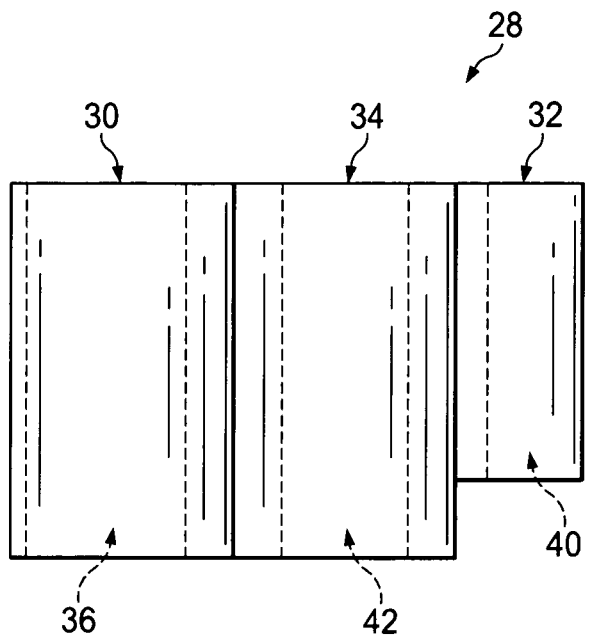
FIG. 4 is a side view illustrating an embodiment of the clip of FIG. 3.
Figure 5:
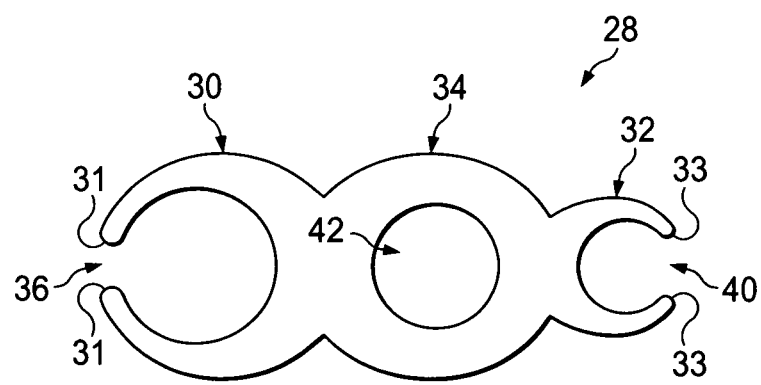
FIG. 5 is a top view illustrating an embodiment of the clip of FIGS. 3 and 4.

A multi-function clip 28, FIGS. 3, 4 and 5, is formed of a suitable synthetic material and includes a first portion 30, a second portion 32 and a third portion 34. The first portion 30 includes a first elongated slotted opening 36 of a first size which is of a construction sufficient for engaging stem 38 extending from earpiece 14 (see also FIG. 1). The second portion 32 includes a second elongated slotted opening 40 of a second size which is smaller than the first size and is of a construction sufficient for engaging second cable portion 16 (FIG. 1). The third portion 34 interconnects the first and second portions 30, 32, respectively. The third portion 34 includes a cylindrical opening 42 and is of a construction sufficient for engaging and receiving post 24 of earhook 22 (see FIG. 2). Each of the above-mentioned connections are snap-on or clip-on connections. That is, the earpiece stem 38 clips or snaps in first opening 36, second cable portion 16 clips or snaps in second opening 40 and stem 24 of earhook 22 clips or snaps in cylindrical opening 42. Also, slots 36 and 40 are relatively opposed to one another. A clip-in or snap-in engagement is possible due to the elongated edges 31 and 33 of respective openings 36 and 40 being sufficiently flexible.

Figure 6:
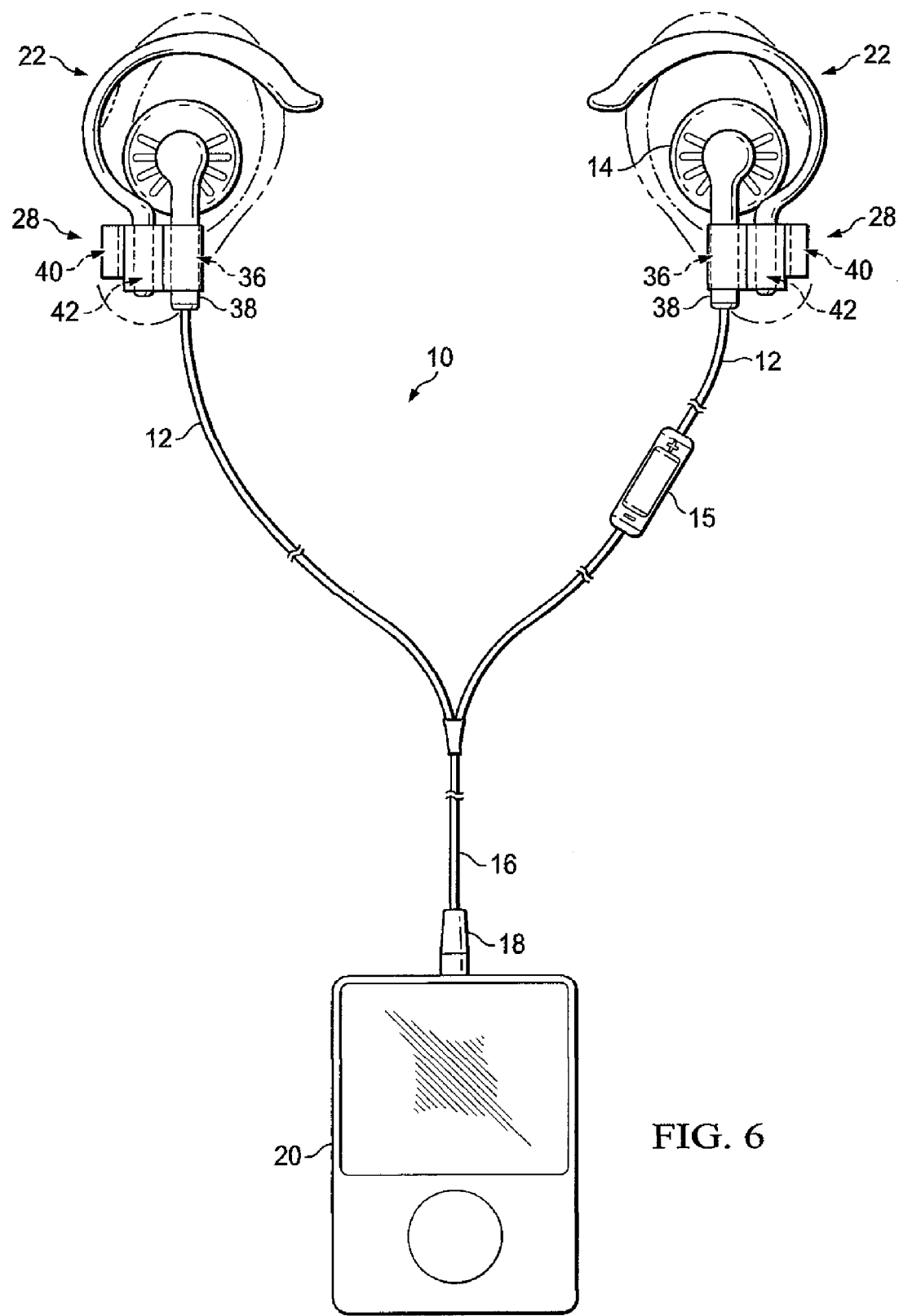
FIG. 6 is a frontal view illustrating an embodiment of a cable similar to FIG. 1 and further including a pair of earhooks and multifunction cable clips.
Figure 7:
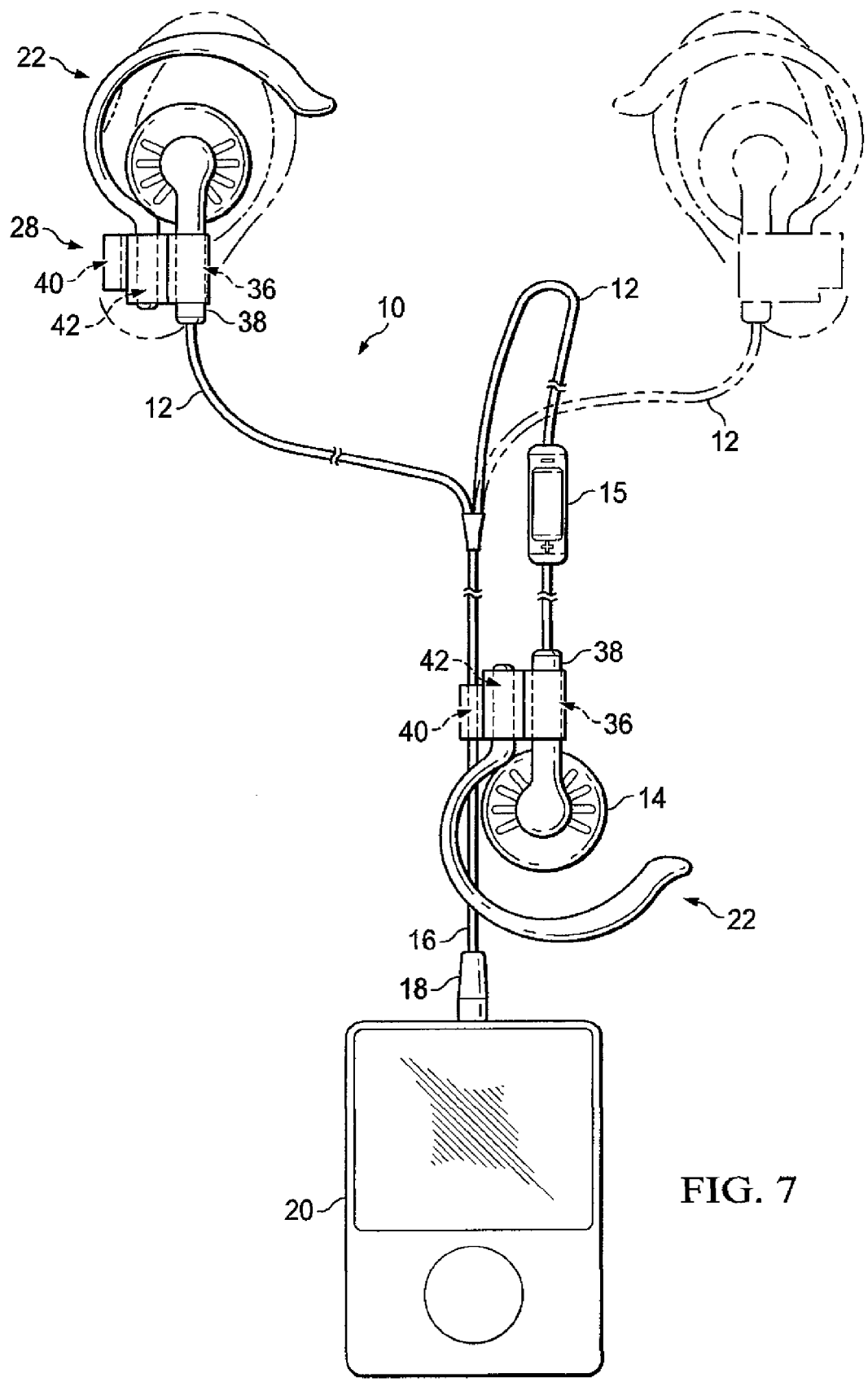
FIG. 7 is an altered view of FIG. 6 illustrating an embodiment of the cable having the clip retaining an earhook and an earpiece on a portion of the cable.

In FIGS. 6 and 7, the utility of multifunction clip 28 is illustrated. In FIG. 6, cable 10 including first cable portions 12 and earpiece speakers 14 each have a clip 28 attached to their respective earpiece stems 38 in opening 36. An earhook post 24 is simultaneously attached to each clip in opening 42. In this mode each hook member 26 may engage with each ear of a user and opening 40 of each clip 28 is unoccupied. In a second mode, FIG. 7, wherein the user may wish to remove one of the earpiece speakers 14 and the respective earhook 22, from one ear so that the ear is free for another use, e.g. to answer a phone call or simply to rest one ear or reduce speaker input into one ear, the associated first portion 12 along with earhook 22, earpiece speaker 14 and clip 28 are free to dangle adjacent second cable portion 16. In this mode, the dangling first cable portion 12 may become an obstruction. To avoid such an obstruction, opening 40 of clip 28 is attached to second-cable portion 16 thus reducing the obstruction. In the second mode, the non-removed earpiece 14, FIG. 7, remains in place in the user's ear.

As a result of the foregoing, in the first use mode, FIG. 6, the first portion 30 of clip 28 is a connector used simultaneously only with the third portion 34 of clip 28, and the second portion 32 is unoccupied. In the second use mode, FIG. 7, the first and second portions 30, 32, respectively, of clip 28 are connectors used simultaneously with the third portion 34 of clip 28.

It can also be observed that in the first use mode, FIG. 6, each clip 28 is simultaneously connected only to each earpiece speaker 14 and each earhook 22. In the second use mode, FIG. 7, one of the clips 28 remains simultaneously connected to only one earpiece speaker 14 and one earhook 22, whereas the other of the clips 28 is simultaneously connected to the other earpiece speaker 14, the other earhook 22, and the second portion 16 of the cable.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of selectively securing a user ear-mounted audio device on a cable, comprising:
   a) providing a pair of audio units each including:
      a clip having a plurality of adjacent openings, at least two of the openings being slotted:
      an earhook mounted in one of the openings of each clip;
      an earpiece speaker mounted in one of the slotted openings of each clip; and
      a third and slotted one of the openings in each clip being unoccupied;
   b) providing a cable including a pair of bifurcated first cable members connected to a second common cable member, each of the bifurcated first cable members having a terminal end;
   c) attaching a first one of the earpiece speakers to the terminal end of one of the first bifurcated cable members;
   d) attaching a second one of the earpiece speakers to the terminal end of the other one of the first bifurcated members;
   e) mounting a first one of the audio units on a first ear of the user;
   f) mounting a second one of the audio units on a second ear of the user; and
   g) selecting either one of the first and second audio units, removing the selected one of the audio units from being ear mounted, and positioning the selected one of the audio units on the second common cable member by engaging the unoccupied third and slotted opening of the clip on the second common cable member.

2. A user ear-mounted audio system comprising:
   a) a pair of audio units each including:
      a clip having a plurality of adjacent openings, at least two of the openings being slotted;
      an earhook mounted in one of the openings of each clip;
      an earpiece speaker mounted in one of the slotted openings of each clip, and
      a third and slotted one of the openings in each clip being unoccupied;
   b) a cable including a pair of bifurcated first cable members connected to a second common cable member, each of the bifurcated first cable members having a terminal end;
   c) a first one of the earpiece speakers being attached to the terminal end of one of the first bifurcated cable members;
   d) a second one of the earpiece speakers being attached to the terminal end of the other one of the first bifurcated members;
   e) a first one of the audio units being mounted on a first ear of the user;
   f) a second one of the audio units being mounted on a second ear of the user;
   and
   g) whereby selectively, either one of the first and second audio units is removable in-tact from being ear-mounted and positioned on the second common cable member in response to engaging the unoccupied third and slotted opening of the clip on the second common cable member.

* * * * *